United States Patent
Nash et al.

(10) Patent No.: US 7,345,952 B2
(45) Date of Patent: Mar. 18, 2008

(54) OPTICAL FIBRE SENSORS MOUNTED ON A CABLE

(75) Inventors: Philip John Nash, Dorchester (GB); Jonathan James Westhall, Dorchester (GB); Geoffrey Alan Cranch, Washington, DC (US); Michael Steven Henshaw, South Wales (GB); John Anstiss Churchill, South Wales (GB)

(73) Assignee: Qinetiq Limited (GB)

( * ) Notice: Subject to any disclaimer, the term of this patent is extended or adjusted under 35 U.S.C. 154(b) by 279 days.

(21) Appl. No.: 10/504,903

(22) PCT Filed: Feb. 6, 2003

(86) PCT No.: PCT/GB03/00540

§ 371 (c)(1),
(2), (4) Date: Mar. 28, 2005

(87) PCT Pub. No.: WO03/071309

PCT Pub. Date: Aug. 28, 2003

(65) Prior Publication Data

US 2005/0174887 A1    Aug. 11, 2005

(30) Foreign Application Priority Data

Feb. 19, 2002  (GB) ................... 0203920.4

(51) Int. Cl.
*G01V 1/20* (2006.01)
*G01V 1/22* (2006.01)
*G01H 9/00* (2006.01)

(52) U.S. Cl. .................................... 367/149

(58) Field of Classification Search ................ 367/149; 385/12, 13; 250/227.14, 227.16

See application file for complete search history.

(56) References Cited

U.S. PATENT DOCUMENTS

| 4,648,082 A | 3/1987 | Savit |
| 5,140,154 A | 8/1992 | Yurek et al. |
| 5,285,424 A | 2/1994 | Meyer |
| 5,317,544 A | 5/1994 | Maas et al. |
| 5,363,342 A | 11/1994 | Layton et al. |
| 5,475,216 A | 12/1995 | Danver et al. |

(Continued)

FOREIGN PATENT DOCUMENTS

WO    WO 00/12977    3/2000

(Continued)

*Primary Examiner*—Daniel Pihulic
(74) *Attorney, Agent, or Firm*—McDonnell Boehnen Hulbert & Berghoff LLP

(57) ABSTRACT

An optical sensor assembly including a coupler and an optical fibre coil. The coupler is attached to the central member of the cable at a position where outer layers of the cable been removed. A first terminal of the coupler is connected to an optical fibre traveling along the cable in a fibre conduit external to the central strength member. A second terminal of the coupler is connected to a first end of the coil and a third terminal of the coupler is connected to an optical fibre a mirrored end. The coil is supported about a tubular mandrel, which mandrel fits over the cable. The other end of the coil is attached to the fibre in the cable. The mandrel is located about the cable at a position covering the coupler and the part of the cable where the outer layers are removed.

32 Claims, 9 Drawing Sheets

U.S. PATENT DOCUMENTS

| | | |
|---|---|---|
| 5,668,779 A | 9/1997 | Dandridge et al. |
| 5,930,203 A | 7/1999 | Sansone |
| 6,108,267 A | 8/2000 | Pearce |
| 2005/0174887 A1 * | 8/2005 | Nash et al. .................. 367/149 |

FOREIGN PATENT DOCUMENTS

| | | |
|---|---|---|
| WO | WO 00/62021 | 10/2000 |
| WO | WO 01/84204 | 11/2001 |

* cited by examiner

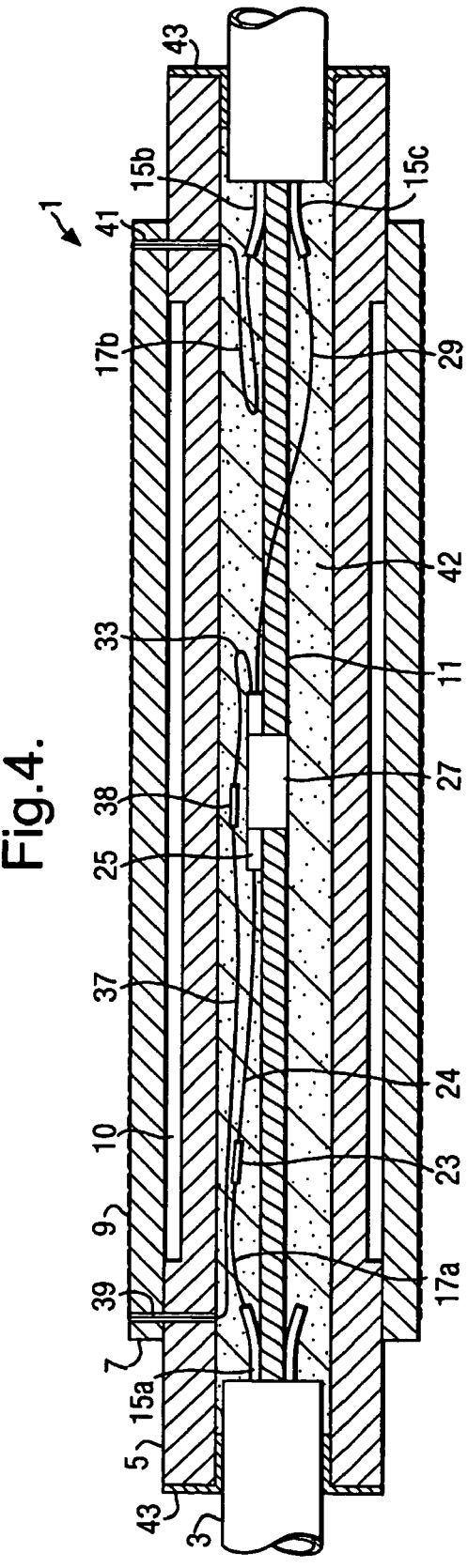
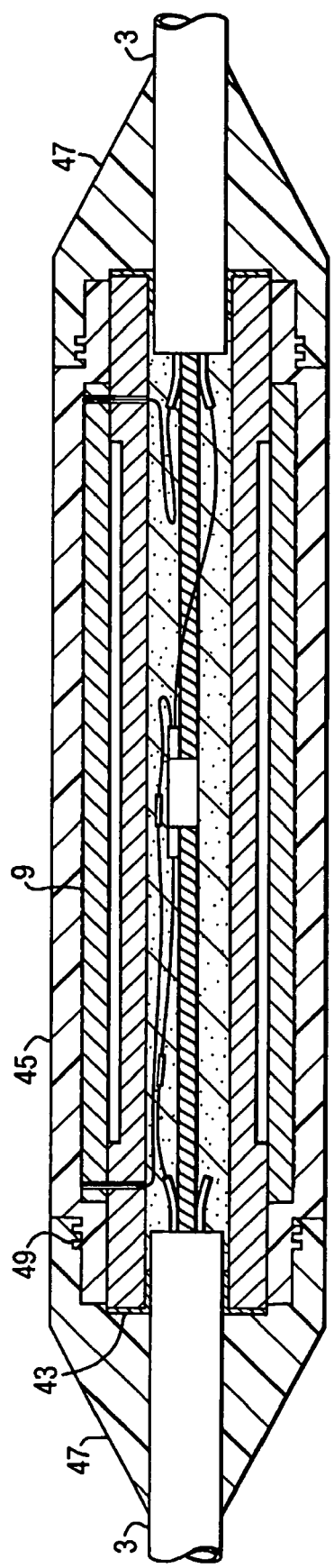
Fig.4.
Fig.5.

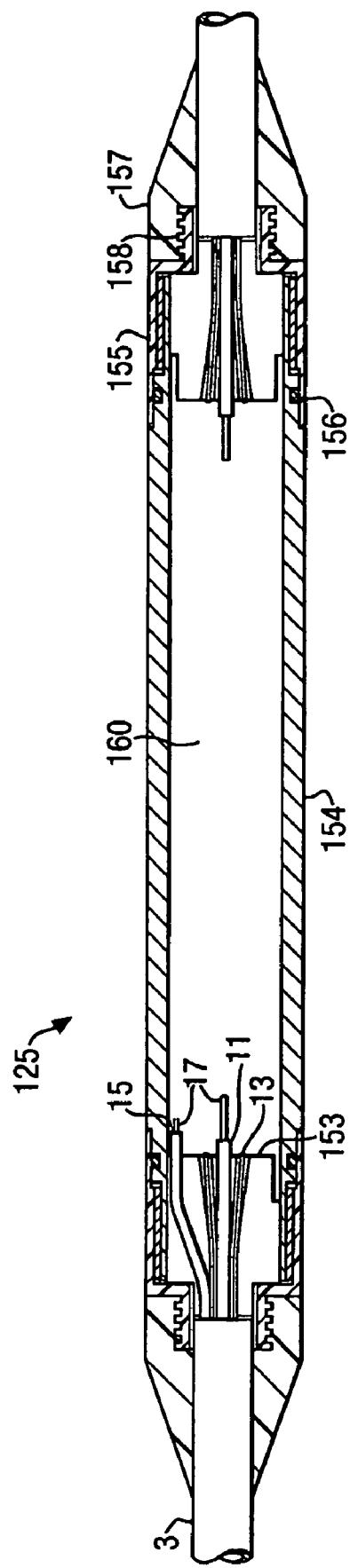

OPTICAL FIBRE SENSORS MOUNTED ON A CABLE

INTRODUCTION

The present invention relates to optical fibre sensor assemblies and in particular, but not exclusively, to assemblies for optical hydrophones.

Much development has taken place relating to the use of optical fibres in sensor arrays, particularly hydrophones. Optical hydrophone array technology offers the possibility of deploying expendable low cost arrays that can be interrogated over large distances. The use of optics-based arrays provides an additional advantage over piezo-electric sensor based systems of being electrically passive and immune to electro-magnetic interference.

Optical hydrophones operate on the principle that pressure changes caused by an acoustic signal such as a sound wave are converted into a strain in a coil of optical fibre. This strain imposes a change in the phase of an optical signal passed through the coil, due to the physical change in length of the fibre and the stress optic effect. The phase change is detected by beating the signal with a reference signal of a slightly different frequency which, when mixed, produces a beat frequency, or heterodyne carrier, equal to the difference in frequency of these two signals. The acoustic signal will therefore appear as a phase modulation on this carrier. It is known to form arrays of such optical hydrophones, which may be optically addressed using a variety of multiplexing techniques, e.g. time division multiplexing (TDM), wavelength division multiplexing (WDM), etc. Such hydrophone arrays are well known and will therefore not be described in detail herein. A more detailed explanation of the addressing of such arrays may be found in PCT Application PCT/GB00/01300, Publication Number WO 00/62021 assigned to "The Secretary of State for Defence (GB)".

Optical hydrophones are typically connected to a cable that carries an optical fibre for connection to the hydrophone using a coupler. Cables for this use typically comprise one or more steel tubes that provide strength to the cable and protect optical fibres carried within the cable. A coupler must be spliced into the optical fibres between the cable and the hydrophone at a position near the hydrophone. To achieve this, a fibre must be extracted from the cable and spliced into the coupler, a fibre from the coupler must be spliced back into the fibre from the cable, the fibre from the cable must be extracted from the cable and connected to the hydrophone coil, and the output from the coil must be connected back into the fibre from the cable. The coupler itself is a delicate component and as such must be protected. Further, both the coupler and the hydrophone should be protected from the external environment. For example, in an underwater deployment, both the coupler and the hydrophone must be kept dry, which means that the coupler housing and the hydrophone coil must be waterproofed. This is achieved by locating the coupler within a waterproof protective housing attached to the outside of the cable at a position near the position at which the waterproofed hydrophone is attached to the cable.

The above-described system has a number of drawbacks. Firstly, the assembly of the components is complicated and time-consuming. In addition, for each hydrophone, two housings (one for the hydrophone and one for the coupler) need to be attached to the cable and protected from the external environment. Also, having two housings adjacent one another on the outside of the cable may compromise the flexibility of the cable. Further, the breaking open of the steel tubes to extract the optical fibre from the cable may compromise the structural integrity of the cable and may result in longitudinal stresses applied to the cable being borne by additional optical fibres within the cable rather than by the steel tubes.

The present invention has been made in consideration of the above-identified problems.

SUMMARY OF THE INVENTION

Viewed from a first aspect, the invention provides an optical sensor assembly for attachment to a cable having a strength member running through the cable and an optical fibre conduit located radially outwards therefrom, the assembly comprising: an optical sensor coil provided about a hollow support member; and a coupler having a first terminal for connection to a fibre of the cable, a second terminal for connection to an input to the sensor coil and a third terminal for connection to an optical fibre having a reflective end; wherein the coupler is arranged to be attached at a position within the interior bore of the support member when the assembly is located in a desired position along the cable.

In a preferred embodiment, the optical sensor assembly is a hydrophone assembly, which is attachable to a cable having a central strength member, or core, and an optical fibre conduit located radially outwards therefrom. The assembly comprises an optical hydrophone coil provided about a tubular hydrophone support, and a coupler having a first input/output port for connection to a fibre of the cable, a second input/output port for connection to an end of the hydrophone coil and a third input/output port connected to a length of optical fibre having a reflective end. The coupler is arranged to be attached at a position within the interior bore of the support when the assembly is located in a desired position along the cable. This is made possible by the presence of the cavity created within the bore of the hydrophone support by the ability to remove outer layers of the cable without compromising its strength and structural integrity. This provides the benefits of containing both the hydrophone and the coupler in a single housing, thus reducing the number of housings required and ensuring the flexibility of the cable adjacent the hydrophone housing and ensuring that all longitudinal stresses in the cable are carried by the central strength member and not by optical fibres. In addition, having only a single housing to assemble, and in preferred embodiments waterproof, makes the assembly of the system easier.

There are a number of ways in which the coupler can be attached within the interior bore of the support member. For example, it could be attached directly to the interior surface of the support member. However, in preferred embodiments, the coupler is arranged to be attached to the strength member of the cable such that it is within the interior bore of the support member when the assembly is located at a desired position along the cable. It has been found that attaching the coupler to the strength member prior to locating the support member over it at the desired location significantly eases construction of the assembly.

According to an embodiment of the invention, the interior bore of the support member is filled with a shock absorbing gel. This provides further protection to the coupler to prevent damage to the coupler being caused by vigorous movements of the cable and hydrophone assembly. An example of a suitable gel is a silicone gel, such as Sylgard™.

According to one embodiment, the optical fibre having the reflective end is passed into a spare conduit of the cable.

This reduces the amount of optical fibre to be contained within the inside bore of the support member.

In some embodiments of the invention, the entire sensor assembly is encased by a waterproof layer. This provides a benefit of keeping the components apart from water, which may cause corrosive or other degradation of the components.

Preferably, the waterproofing is provided by a waterproof casing comprising a central piece to cover the sensor coil and two end pieces to provide a seal between the central member and the cable, the join between the end pieces and the central piece being effected by an overlapping sawtooth fitting. This provides a benefit of the waterproof casing being easy to assemble and provides a join which is not easily water-penetrable.

In preferred embodiments, a second end of the coil is attached to the fibre of the cable. This provides that further sensor assemblies may be connected in series with the sensor assembly.

In preferred embodiments, the sensor assembly further comprises a retaining member for retaining the support member in place about the cable.

Preferably, the support member provides an air-backing to the coil. In preferred embodiments, the support member comprises a tubular mandrel, and a coil support member located radically outwardly therefrom and upon which the coil is wound, wherein the air-backing is co-operatively provided by the tubular mandrel and the coil support member.

In preferred embodiments, the strength member is centrally located within the cable. This enables a symmetric design and easier placement of one or more optical fibre conduits about the central strength member.

The optical sensor may be any suitable sensor. However, in preferred embodiments, the optical sensor is an optical hydrophone.

Viewed from another aspect, the present invention provides a method for attaching an optical sensor assembly having an optical sensor coil and a coupler to a cable having a strength member running through the cable and an optical fibre conduit for containing an optical fibre located radially outward from the strength member, the method comprising: at a desired position for the optical sensor assembly along the cable, revealing the strength member and releasing an optical fibre from the conduit; breaking the released fibre to create first and second ends; splicing the first end of the broken fibre to a first terminal of the coupler; splicing a second terminal of the coupler to a first end of the sensor coil; splicing a third terminal of the coupler to an optical fibre having a reflective end; splicing a second end of the sensor coil to the second end of the broken fibre; attaching the coupler to the revealed strength member of the cable; and locating the sensor coil supported on a hollow support member at the desired position over the cable, such that the coupler is also covered by the support member.

In a preferred embodiment, a method can be provided for attaching an optical hydrophone assembly to a cable having a central strength member, or core, and an optical fibre conduit for containing an optical fibre located radially outward from the strength member. The method preferably comprises removing the outer covering of the cable at a desired position for hydrophone location to expose the central core and to release an optical fibre from a conduit; breaking the released fibre to create first and second ends; connecting the first end of the broken fibre to a first input/output port of a coupler; connecting a second input/output port of the coupler to a first end of a hydrophone coil; connecting a third input/output port to a length of optical fibre having a reflective end; connecting a second end of the hydrophone coil to the second end of the broken fibre; attaching the coupler to the central core of the cable; and fitting the hydrophone coil supported on a tubular coil support over the cable covering the part of the cable where the outer covering is removed and the coupler. This method provides a way of protecting the coupler within the hydrophone without compromising the structural integrity of the cable. It also provides that only a single protective housing is required for both the hydrophone and the coupler.

Viewed from a third aspect; the invention provides an optical sensor array comprising: a plurality of optical sensor assemblies according to the first aspect of the present invention; a cable about which the sensor assemblies are attached and for carrying one or more optical fibres to which the sensor assemblies are attached; and the one or more optical fibres being connectable to a control unit for generating and receiving optical signals to be transmitted through optical fibre sensor coils of the sensor assemblies. This provides an advantageous array made up of sensors having the advantages described above.

BRIEF DESCRIPTION OF THE FIGURES

Particular embodiments of the present invention will now be described by way of example only with reference to the accompanying drawings, of which:

FIG. 4 shows a schematic cutaway representation of the assembled hydrophone of FIG. 1;

FIG. 5 shows a schematic cutaway representation of the assembled and waterproofed hydrophone of FIG. 1;

FIG. 11b shows the interleaved reflected signal structure of hydrophones in simple arrays of FIG. 11a; and FIG. 12 shows a schematic cutaway representation of a junction box of FIG. 10.

SPECIFIC EMBODIMENTS

Figure 1:
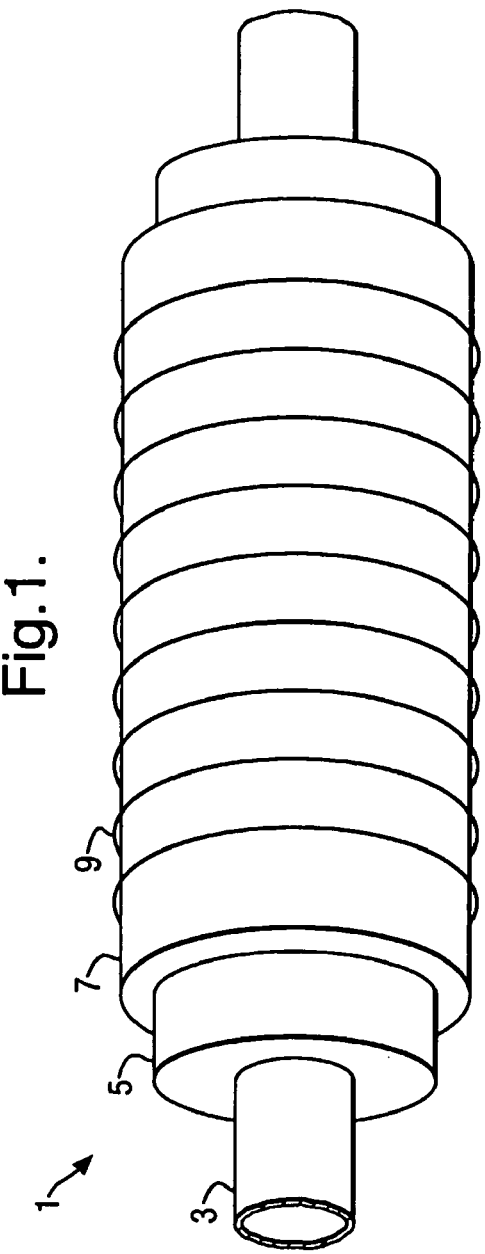
FIG. 1 shows a schematic representation of a hydrophone.

Referring to FIG. 1, there is shown an optical hydrophone assembly 1 attached to a cable 3. The cable 3 has a strength member and an optical fibre conduit within a polyurethane sheath (not shown in FIG. 1). The hydrophone assembly 1 comprises a tubular mandrel 5 mounted about the cable and a coil support 7 mounted about the mandrel 5. A hydrophone coil 9 comprising a coil of optical fibre is coiled around the coil support. The longitudinal axis of the coil 9 is parallel to the axis of the cable 3 through the mandrel 5. In the assembly shown in FIG. 1 the coil 9 is represented schematically, and would in general consist of several layers of tightly wound optical fibre. In addition, before use, the hydrophone assembly of a preferred embodiment requires waterproofing to protect the hydrophone elements, including elements internal to the hydrophone not shown in FIG. 1, from water damage.

Figure 2:
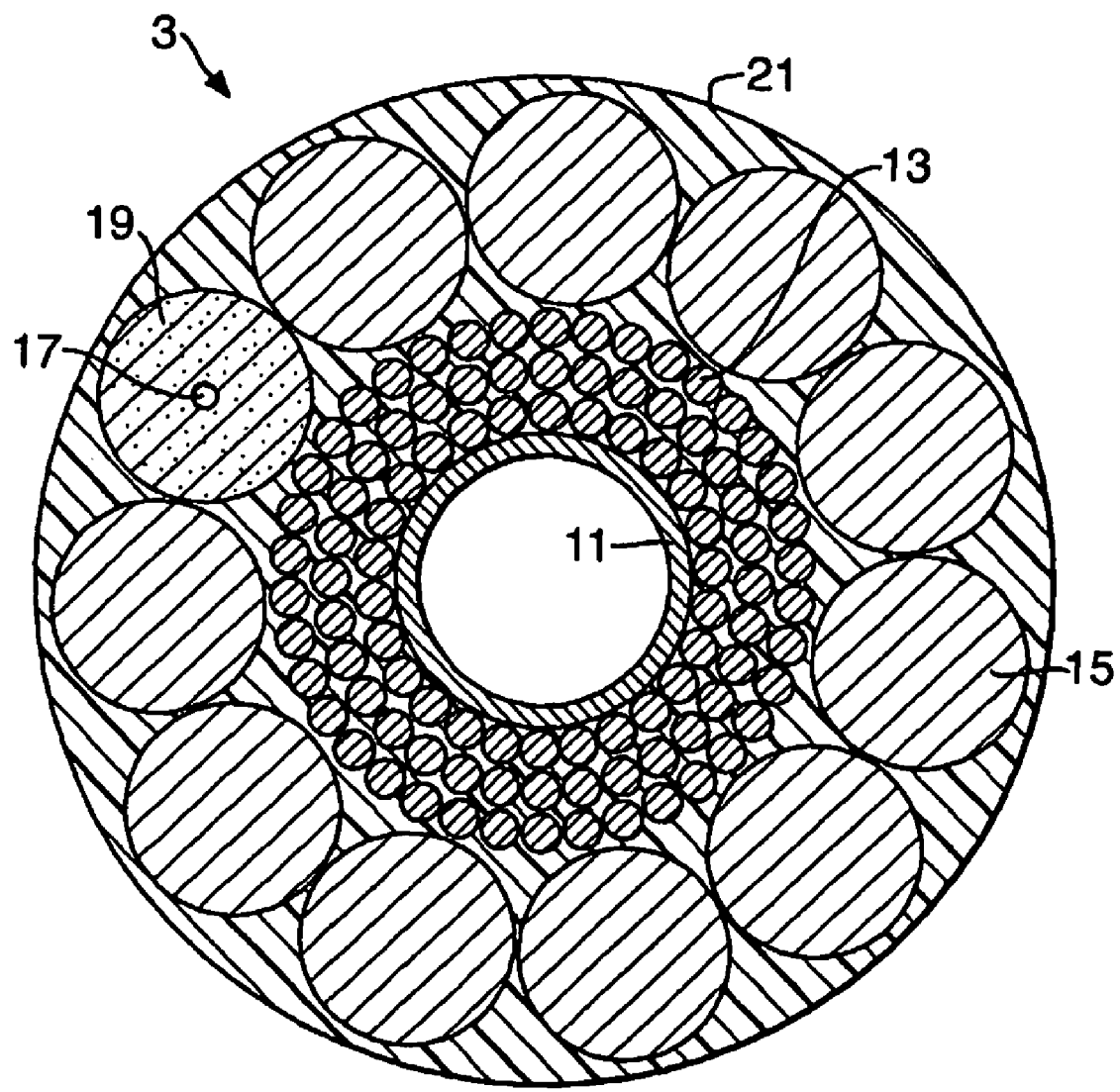
FIG. 2 shows a fibre optical carrying cable suitable for use with the hydrophone of FIG. 1.

Referring now to FIG. 2, there is shown a schematic representation of a cross-section through a cable 3 suitable for use with the optical hydrophone assembly of the present embodiment. The prime structural strength of the cable 3 is provided by a steel tube 11 surrounded by a plurality of steel cables 13. Arranged radially around the tube 11 and fibres 13 are a plurality of PTFE fibre sheaths 15. Housed within at least one of the fibre sheaths 15 is an optical fibre 17. Surrounding the fibre 17 within the sheath is a gel 19 that provides additional protection to the fibre 17. Surrounding the cable and providing waterproofing and impact resisting protection is a polyurethane sheath 21.

The hydrophone assembly of the present embodiment will now be described in more detail with reference to FIGS. 3 to 5.

Figure 3:
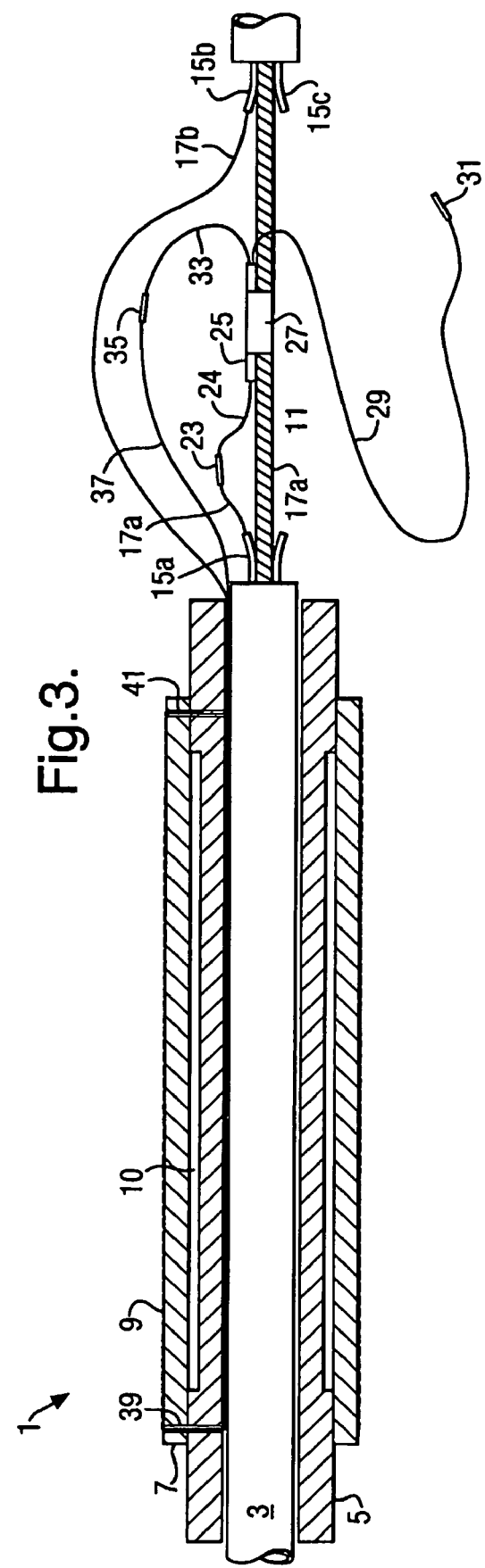
FIG. 3 shows a schematic cutaway representation of an assembly stage of the hydrophone of FIG. 1.

Shown in FIG. 3 is a schematic cutaway view of the hydrophone of the present embodiment in a partially assembled state. From this Figure it can be clearly seen that the outer layers of the cable 3 have been removed to expose the steel core 11 at a position corresponding to the intended location of the hydrophone. The inside diameter of the mandrel 5 is greater than the outside diameter of the cable 3 by an amount sufficient to allow the mandrel 5 to move freely over the cable 3 and to allow optical fibres to be passed through the gap between mandrel and cable without damage.

As can be seen in FIG. 3, the optical fibre 17 contained in fibre sheath 15 of the cable 3 (as shown in FIG. 2) emerges from the cable 3 as fibre 17a contained in fibre sheath 15a, which fibre 17a is spliced together with a first end of further optical fibre 24 at splice 23. The other end of the fibre 24 is connected to a coupler 25 which coupler is attached to the steel core 11 by means of a coupler fixing 27.

The coupler 25 has three input/output terminals. The first terminal is connected to the fibre 24, the third terminal is connected to a fibre 29 having a mirrored end 31 and the second terminal is connected to a further fibre 33 which is spliced at splice 35 to a fibre 37 which is used to form the hydrophone coil 9. The fibre 37 passes through channel 39 through the mandrel 5 and coil support 7 and then forms the coil 9 on the outside of the coil support 7. Thus a signal passing along the cable (from the left in FIG. 3) to the hydrophone enters the coupler 25 at the first terminal and is split into two channels according to the splitting ratio of the coupler. The first of these channels enters the mirrored end fibre 29 via the second terminal and the second channel enters the hydrophone coil 9 via the third terminal.

The hydrophone coil 9 needs to be "air-backed" to operate most efficiently as a pressure sensor. Therefore, the outside diameter of the mandrel 5 is formed to have an annular recess extending along the length of the mandrel 5 over which the coil 9 is to be formed, this recess then being covered by the coil support 9 to create an air gap 10 to act as an air-backing for the coil. The length of optical fibre wound around the coil support 5 to form the coil 9 is, in the present embodiment, typically of the order of 100 m.

The fibre 17b from the second end of the coil 9 passes through a second channel 41 to return to the interior of the mandrel 5 before passing into the cable 3 within fibre sheath 15b.

Referring now to FIG. 4, there is shown the hydrophone assembly 1 in position on the cable 3. Here can be seen the fibre 17a emerging from fibre sheath 15a of the cable 3 into the cavity formed between the interior diameter of the mandrel 5 and the outside diameter of the steel core 11 of the cable 3. As discussed above with reference to FIG. 3, the fibre 17a is spliced at splice 23 to fibre 24 which is connected to the first terminal of the coupler 25. The coupler 25 is attached to the steel core 11 by means of a coupler fixing 27. To the third terminal of the coupler 25 is connected a fibre 29 having a mirrored end 31 (not shown in FIG. 4) which mirrored end 31 has been fed into a spare fibre sheath 15c of the cable 3. This causes the interior of the cavity to be less complicated as otherwise the mirrored end fibre 29, which, in the present embodiment is typically of the order of 2 m long, would have to be coiled up within the cavity.

Connected to the second terminal of the coupler 25 is a fibre 33 which is spliced at splice 35 to fibre 37 which passes through channel 39 in the mandrel 5 and coil support 7 and then forms the coil 9. At the other end of the coil 9, fibre 17b passes through channel 41 to enter the cavity before passing into fibre sheath 15b of the cable 3.

Thus is can be seen from FIG. 4 that the removal of the outer layers of the cable 3 under the mandrel 5 allows the coupler 25 to be located within the cavity formed between the inside diameter of the mandrel and the steel core 11. As a result of the cable having a central strength providing member with the optical fibre being held in a sheath radially outside that central member, it is possible to remove the outer layers of the cable to make a space for the coupler without compromising the strength of the cable at the hydrophone.

To prevent the mandrel 5 from moving away from the desired position on the cable 3, it is held in place by mandrel caps 43 which fit tightly to the outside of the cable 3 to stop the mandrel 5 from being able to move along the cable 3. To provide the coupler 25 with increased protection from impacts to the hydrophone assembly, the cavity between the inside diameter of the mandrel 5 and the steel tube 11 is filled with a shock-absorbing gel 42. A gel suitable for use as shock-absorbing gel 42 is a silicone gel such as Sylgard™.

As the hydrophone assembly shown in FIG. 4 is, in preferred embodiments, intended for underwater use, it is important that the device be made waterproof so that the components are not damaged by immersion in water. This is of particular importance as the majority of underwater uses of optical hydrophones are in saline water (as fresh water accounts for only a very small percentage of the Earth's surface water) and saline water degrades optical fibres eventually causing failure. Therefore, there is shown in FIG. 5 the hydrophone assembly of FIG. 4 with waterproofing elements added. As the internal structure of the hydrophone shown in FIG. 5 is identical to that described above with reference to FIG. 4 it will not be described again here.

The waterproofing of the hydrophone assembly is, in the present embodiment, achieved using cast polyurethane. A first polyurethane casting is used to form a body casing 45 which covers the entire length of the coil 9 with a single casing. At either end of the hydrophone assembly are used an end casing 47. The join between the body casing 45 and each end casing 47 is made using a sawtooth gripped overlap area 49. In a preferred embodiment, the polyurethane is an APT FLEX2 polyurethane casting compound.

Thus there has now been described an optical hydrophone assembly wherein a coupler to be located in an optical pathway leading to the hydrophone is physically retained and protected within the body of the optical hydrophone assembly.

There will now be described, with reference to FIGS. 6 to 11, a system wherein a plurality of optical hydrophones as described above are used to form a hydrophone array. In order that a single control unit having a single pair of control fibres (one upstream and one downstream) may be used, the control unit multiplexes the control signals. In the present embodiment, the signals are multiplexed using a combination of Time-Division-Multiplexing (TDM) i.e. switching between pulses of different signals at a given wavelength and Wavelength-Division-Multiplexing i.e. simultaneously transmitting two or more signals having different wavelengths. A fuller explanation of multiplexed control of optical hydrophone arrays is to be found in PCT Application PCT/GB00/01300, Publication Number WO 00/62021.

Figure 6:
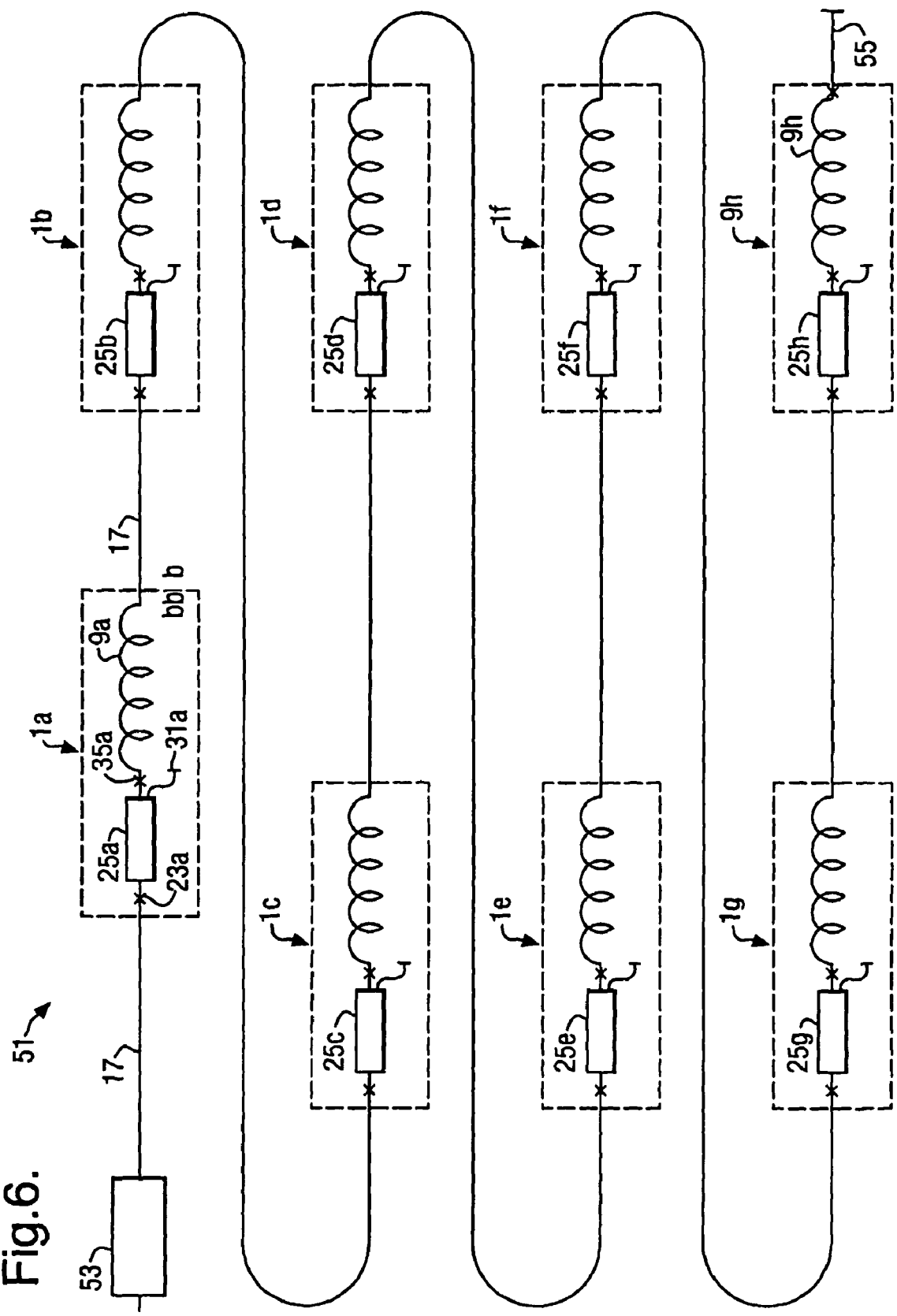
FIG. 6 shows a schematic representation of a plurality of hydrophones connected to form an array.

Referring first to FIG. 6, there is shown a schematic arrangement of the connection of eight hydrophone assemblies 1a-1h into a linear array. To control all of the hydrophones in the array using a single control fibre, TDM is used. An optical signal is supplied to the array by an array signal source 53, the signal passes along optical fibre 17 to first hydrophone assembly 1a. In the hydrophone assembly 1a, a coupler 25a is spliced between the fibre 17 (at splice 23a) and the hydrophone coil 9 (at splice 35a) and a further output from the coupler 25a is connected to an optical fibre having a mirrored end 31a. The output from the hydrophone coil 9a then passes down the fibre 17 to second array hydrophone 1b. Each hydrophone 1a-1h has the same arrangement of physical components, until at the end of the array, following the coil 9h of hydrophone assembly 1h, a further mirrored end 55 is spliced onto the output of the coil 9h, such that all signals passing down the fibre as far as the end of the array are thus reflected back along the array to the source 53 which also receives the reflected signals for analysis.

Each of the couplers 25a-25h has a different coupler ratio, that is the ratio between the amount of incoming signal strength arriving from the direction of the source 53 being output to the mirrored end 31 and the amount of that incoming signal being output to the hydrophone coil 9. The typical ratio of each of the couplers 25a-25h is set out in table 1 below. When an optical signal is travelling in the opposite direction, that is from either the hydrophone coil or the mirrored end toward the source 53, the signal is not reflected.

TABLE 1

Typical Coupler ratios of couplers 1a to 1h of FIG. 6.

| Coupler | Coupler ratio | Percentage of original signal magnitude reflected by coupler via mirrored end |
| --- | --- | --- |
| 25a | 5:95 | 0.25 |
| 25b | 6:94 | 0.36 |
| 25c | 8:92 | 0.64 |
| 25d | 10:90 | 1 |
| 25e | 13:87 | 1.7 |
| 25f | 19:81 | 3.6 |
| 25g | 28:72 | 7.8 |
| 25h | 46:54 | 21 |

As can be seen from Table 1, at each successive coupler a higher percentage of the remaining signal magnitude is reflected than at the coupler before. This actually results in a slight successive increase in the percentage of original signal magnitude reflected back by each successive coupler 25 by means of its associated mirrored end 31. This increase in theoretical reflected signal magnitude is needed to overcome signal magnitude loss along the length of the array caused by an insertion loss associated with each component in the array. Thus, because the signal has to travel through an increasing number of components as it passes along the array, the cumulative effects of insertion loss become greater the further from the source 53 the signal travels. Thus in actual fact the amount of original strength being reflected at each coupler 25 is approximately the same taking insertion and other losses into account.

In the present embodiment, the distance between the source 53 and the first hydrophone assembly 1a is approximately 2000 m, the distance between each hydrophone assembly is approximately 1.5 m and the length of the final mirrored end 55 is approximately 0.5 m, giving a total array length of approximately 12 m.

Figure 7:
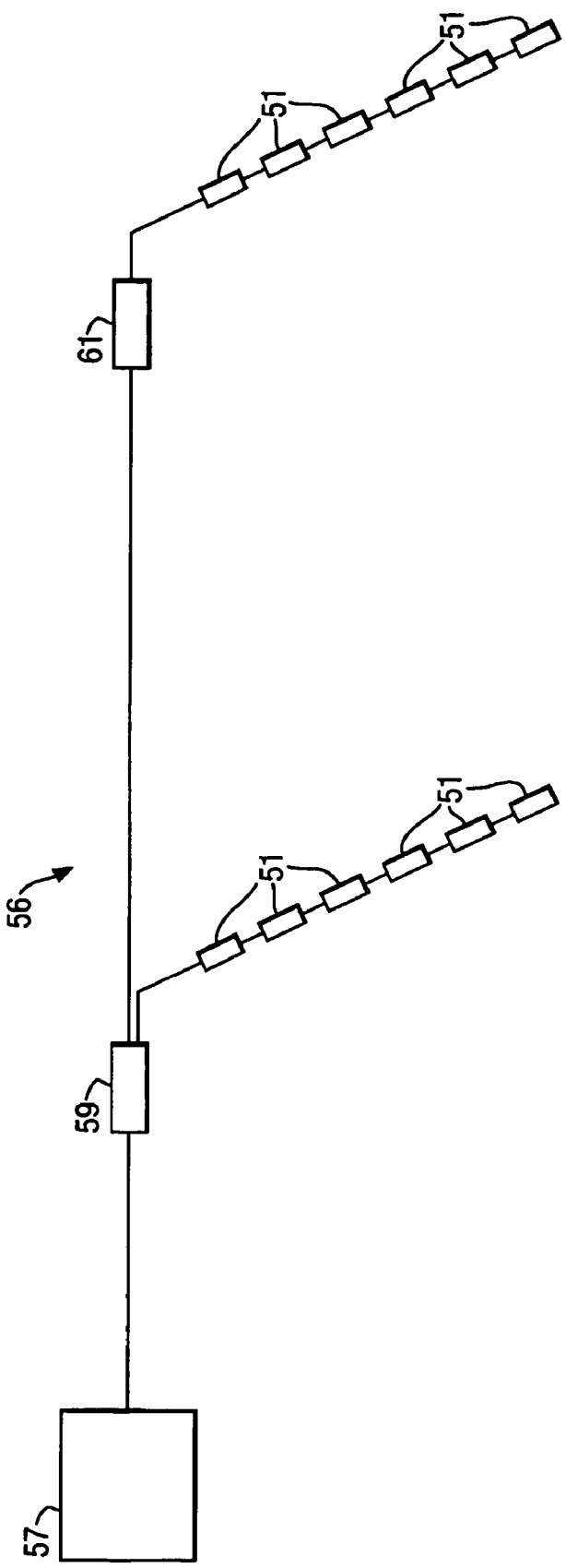
FIG. 7 shows a schematic representation of a system having a plurality of arrays of hydrophones.

Each simple array 51 of eight hydrophone assemblies 1a-1h can be incorporated into a larger complex array comprising many such simple arrays. Such a complex array 56 is shown in FIG. 7. To supply signals to and analyse reflected signals from the complex array 56, a control and processing unit 57 is provided. A first string of six simple arrays 51 is connected to the cable from the unit 57 via a first node 59. A second string of six simple arrays 51 is connected to the cable from the unit 57 by a second node 61. Thus the total number of hydrophones in the complex array of the present embodiment is ninety-six. In an embodiment where the array is a seabed array of hydrophones, the control and processing unit 57 is located onboard the vessel which deployed the array or on shore.

As a result of the number of hydrophones to be separately identified within the complex array 56, even when multiplexing a plurality of hydrophones onto a single optical fibre, there is requirement for more than a single optical fibre to be present within the cable. If a plurality of optical fibres were to be contained in the fibre sheaths 15 of the cable (referring now to FIG. 2), then the internal construction of each hydrophone assembly 1 would become much more complicated as a number of extra fibres would be present within the hydrophone assembly's internal cavity. Therefore, to avoid this problem, all but a presently required optical fibre is, in the present embodiment, carried within the central steel tube 11 of the cable. This arrangement does however lead to a requirement that the central tube be broken at intervals to extract a required optical fibre from the tube and to insert a no longer required optical fibre into the tube. For this purpose a junction box (described in more detail later) is used.

Figure 8:
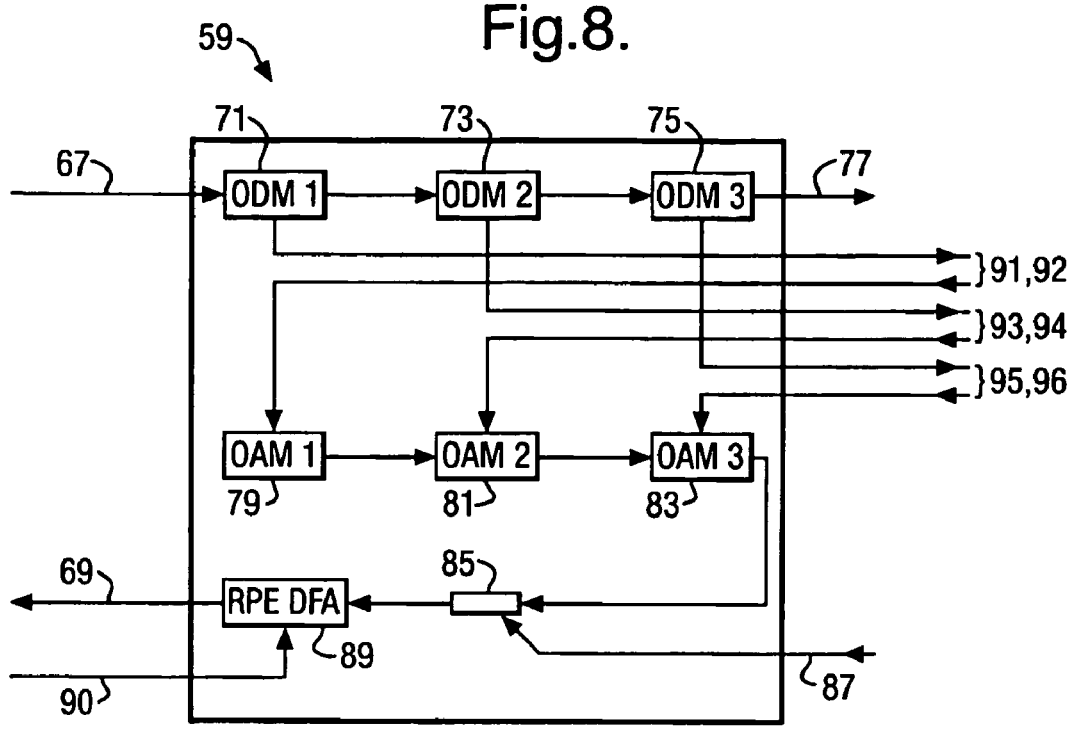
FIG. 8 shows a schematic representation of a first node of the system of FIG. 7.

Referring now to FIG. 8, the internal structure of the first node 59 will now be described in further detail.

The cable from the control and processing unit 57 carries two signal optical fibres 67 and 69 and a pump optical fibre 90. Fibre 67 is the fibre through which signals from the control and processing unit 57 are transmitted to the first node 59 and the fibre 69 is the fibre through which reflected signals returning to the control and processing unit 57 are transmitted from the first node 59 to the control and processing unit 57. The control signals received on the fibre 67 are both Time and Wavelength division multiplexed. The control signals for each pair of simple arrays 51 are Time Division Multiplexed at a given wavelength whereas the control signals for different pairs of simple arrays 51 are Wavelength Division Multiplexed. The input fibre 67 is connected to a first Optical Drop Multiplexer (ODM) 71. At first ODM 71 any signal components received from the control and processing unit 57 having a wavelength corresponding to the predetermined wavelength for a first simple array pair are demultiplexed from the input and are fed to a first pair upstream fibre 91. The remaining signal is then passed to a second ODM 73 which demultiplexes signal components having a wavelength corresponding to the predetermined wavelength for a second array pair and passes those components to a second pair upstream fibre 93. The signal remaining after second ODM 73 is then passed to a third ODM 75 which demultiplexes signal components having a wavelength corresponding to the predetermined wavelength for a third array pair and passes those components to a third pair upstream fibre 95. The signal remaining after third ODM 75 is then passed to a fibre 77 which carries the signal to the second node 61.

Corresponding to each upstream fibre 91, 93, 95 is a downstream fibre 92, 94, 96. Thus three upstream/downstream fibre pairs 91 and 92, 93 and 94, and 95 and 96 are present. These three fibre pairs are passed into the cable to the strings of simple arrays 51 shown in FIG. 7. In the present embodiment, each fibre pair is used to drive two simple arrays 51. This will be discussed in greater detail with reference to FIG. 10 below. The returning signals from the simple arrays 51 are received over the downstream fibres 92, 94, and 96. The signal from the first pair downstream fibre 92 is passed into a first Optical Add Multiplexer 79 where it is added to nothing such that the output of the first OAM 79 is the same as the input minus insertion loss. The output of first OAM 79 is then passed to second OAM 81 where the returning signal from the second pair downstream fibre 94 is added to the signal stream. The output from second OAM 81 is then passed to a third OAM 83 where the returning signal from the third pair downstream fibre 96 is added to the signal stream. The output from third OAM 83 is then passed to a coupler typically of 50:50 ratio 85 where it is added typically with equal weight to the returning signal from second node 61 which is carried on fibre 87. Following this, the combined returning signal is passed through a Remote Pumped Erbium Doped Fibre Amplifier (RPEDFA) 89 which optically amplifies the signals returning to the control and processing unit 57 from the nodes 59, 61. An optical pump signal transmitted on the pump optical fibre 90 from the control and processing unit 57 is used by the RPEDFA 89 to perform the amplification. The output from the RPEDFA 89 is passed to the return fibre 69 to be carried to the control and processing unit 57.

Thus there has now been described the means by which a single control signal stream carried over a single fibre is split onto a plurality of fibres according to signal component wavelength to be directed to individual array elements or groups of individual array elements.

Figure 9:
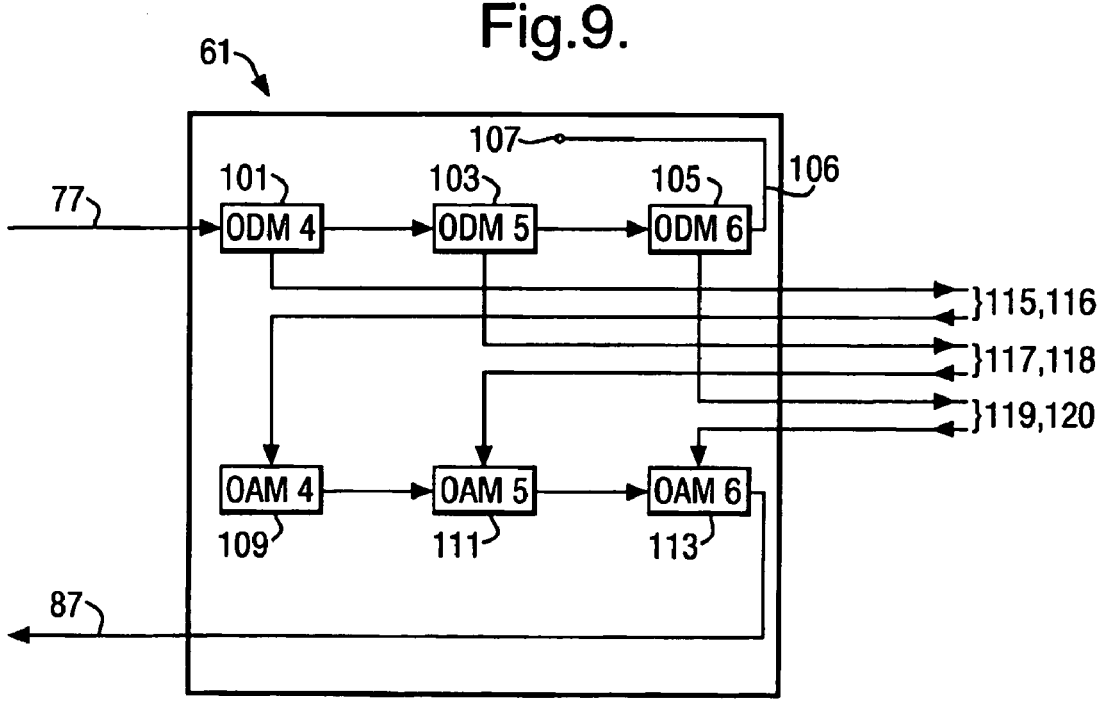
FIG. 9 shows a schematic representation of a second node of the system of FIG. 7.

Referring now to FIG. 9, the operation of the second node 61 will now be described in greater detail. The cable from first node 59 carries the two optical fibres 77 and 87. Fibre 77 is the fibre through which signals from the control and processing unit 57 are transmitted to second node 61 via first node 59 and the fibre 87 is the fibre through which reflected signals returning to the control and processing unit 57 are transmitted from second node 59 to the control and processing unit 57 via first node 59. As the control signals received at second node 61 are the same as those received at first node 59 with those signals required by first node 59 removed, the control signals received on the fibre 77 are both Time and Wavelength division multiplexed. The control signals for each pair of simple arrays 51 are Time Division Multiplexed at a given wavelength whereas the control signals for different pairs of simple arrays 51 are Wavelength Division Multiplexed. The input fibre 77 is connected to fourth Optical Drop Multiplexer (ODM) 101. At fourth ODM 101 any signal components received from the control and processing unit 57 having a wavelength corresponding to the predetermined wavelength for a fourth simple array pair are demultiplexed from the input and are fed to a fourth pair upstream fibre 115. The remaining signal is then passed to a fifth ODM 103 which demultiplexes signal components having a wavelength corresponding to the predetermined wavelength for a fifth array pair and passes those components to a fifth pair upstream fibre 117. The signal remaining after fifth ODM 103 is then passed to a sixth ODM 105 which demultiplexes signal components having a wavelength corresponding to the predetermined wavelength for a sixth array pair and passes those components to a sixth pair upstream fibre 119. The signal remaining after sixth ODM 105 is then passed to a fibre 106 which carries any remaining signal to ground, i.e. causing any remaining signal to be lost. This function may be achieved, for example, by terminating the fibre using a refractive index matching gel which prevents reflection, thus ensuring that any remaining signal is lost.

Corresponding to each upstream fibre 115, 117, 119 is a downstream fibre 116, 118, 120. Thus three upstream/downstream fibre pairs 115 and 116, 117 and 118, and 119 and 120 are present. These three fibre pairs are passed into the cable to the strings of simple arrays 51 shown in FIG. 7. In the present embodiment, each fibre pair is used to drive two simple arrays 51. This will be discussed in greater detail with reference to FIG. 10 below. The returning signals from the simple arrays 51 are received over the downstream fibres 116, 118, and 120. The signal from the fourth pair downstream fibre 116 is passed into fourth Optical Add Multiplexer 109 where it is added to nothing such that the output of the fourth OAM 109 is the same as the input minus insertion loss. The output of fourth OAM 109 is then passed to fifth OAM 111 where the returning signal from the fifth pair downstream fibre 118 is added to the signal stream. The output from fifth OAM 111 is then passed to a sixth OAM 113 where the returning signal from the sixth pair downstream fibre 120 is added to the signal stream. The output from sixth OAM 113 is then passed to fibre 87 to return to first node 59 where it will be added to the returning signals from the array string attached to first node 59 before passing to control and processing unit 57 via fibre 69.

Thus there has now been described the means by which a single control signal stream carried over a single fibre is split onto a plurality of fibres according to signal component wavelength to be directed to individual array elements or groups of individual array elements.

The arrangement by which the individual simple arrays 51, each comprising eight hydrophones 1, are connected to the pairs of control fibres established at each node will now be described in more detail with reference to FIG. 10.

In the following description of FIG. 10, it is assumed that the pairs of control fibres providing the controlling input are pairs 91 and 92, 93 and 94, and 95 and 96 output from first node 59. However it will be appreciated that the same arrangement is applicable to the pairs of control fibres 115 and 116, 117 and 118, and 119 and 120 from second node 61.

Figure 10:
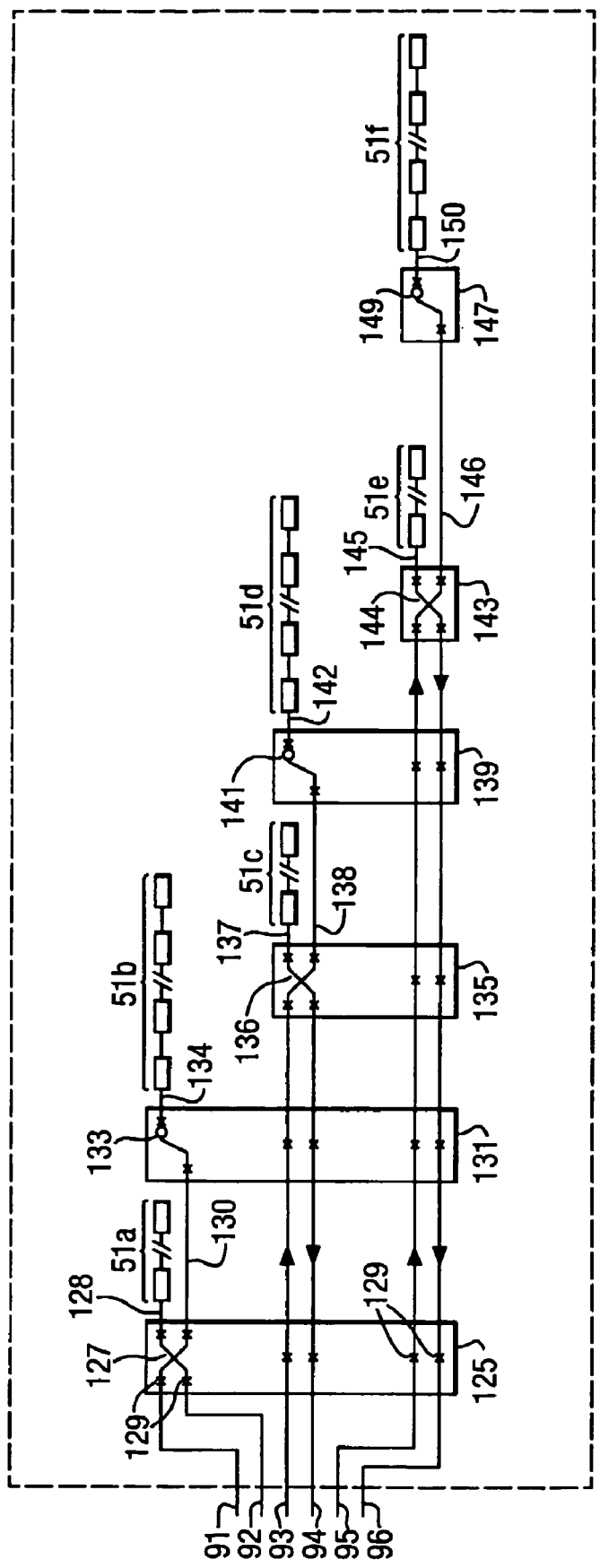
FIG. 10 shows a schematic representation of the connection of a plurality of arrays of hydrophones to a node of FIG. 8 or 9.

FIG. 10 shows a schematic view of the arrangement by which the pairs of control fibres are connected to their respective simple arrays of hydrophones. As shown in the Figure, all three pairs of control fibres 91 and 92, 93 and 94, and 95 and 96 are connected into a first junction box 125. Before junction box 125, all six fibres are within the central tube 11 of the cable 3 carrying them (see FIG. 2). At first junction box 125, the central tube 11 is opened and fibres 91 and 92 are extracted and passed to a first 50:50 coupler 127. At first 50:50 coupler 127, the signal from upstream fibre 92 is split equally in two, with half being passed down a fibre 128 to a first simple array 51a, which fibre 128 is carried by the cable in a fibre sheath 15 external to the central tube 11, and the other half being passed down a fibre 130 which re-enters the central tube 11 and passes down the cable. First 50:50 coupler 127 also provides that all reflected signals from the first simple array 51a or the fibre 130 are combined and passed back to first node 59 via downstream fibre 92. The other two fibre pairs, 93 and 94, and 95 and 96 pass uninterrupted through first junction box 125. Where necessary, splices 129 are used to join different fibres within the junction box 125. For example, where the cable entering the junction box and the cable leaving the junction box are two separate cables, a splice is necessary to join the fibres entering the junction box to those leaving it.

Thus the fibres 93, 94, 95, 96 and 130 pass down the cable from first junction box 125 within the central tube 11 and the fibre 128 passes down the cable from first junction box 125 within a fibre sheath 15. The fibre 128 is connected to each of the hydrophones 1 attached to the cable as described with reference to FIGS. 3 to 5 above in first simple array 51a as described with reference to FIG. 6 above.

Thus the fibres 93, 94, 95, 96 and 130 arrive in the cable at a second junction box 131. Again fibres 93, 94, 95 and 96 pass through the junction box unimpeded. However fibre 130, carrying one half of the signal from upstream fibre 91, exits the central tube 11 and enters a delay line 133. The delay line 133 has a length equal to half the fibre length of the fibre comprising the hydrophone coil 9. The delay line 133 causes the reflected pulses to be moved in time such that so-called "nesting" of the pulses may be effected. This will be described in greater detail below with reference to FIG. 11. The delayed signal exits the delay line 133 into fibre 134 which carries the signal, in a fibre sheath 15 of the cable, away from second junction box 131. Thus the cable following second junction box 131 has fibres 93, 94, 95 and 96 in the central tube 11 and fibre 134 in a fibre sheath 15. The fibre 134 is then connected to each of the hydrophones 1 attached to the cable as described with reference to FIGS. 3 to 5 above in second simple array 51b as described with reference to FIG. 6 above.

Following the hydrophones of second simple array 51b, the cable enters a further junction box 135. At this junction box, fibres 93 and 94 exit the central tube 11 and are spliced into a second 50:50 coupler 136. Thus the control signals passing down upstream fibre 93 are divided into two equal streams, the first of which passes down a fibre 137 which enters a fibre sheath 15 of the cable and drives a third simple array 51c of hydrophones 1. The second stream enters a fibre 138 which passes into the central tube 11 of the cable along with fibre 95 and 96. The fibres 137 and 138 are connected into second 50:50 coupler 136 such that all reflected signals returning along those fibres are combined and passed into downstream fibre 94 to return to first node 59 and thereafter the control and processing unit 57.

The fibres 95, 96 and 138 contained in the central tube 11 of the cable, following the hydrophones 1 of third simple array 51c driven by fibre 137, enter a fourth junction box 139. Here, the fibres 95 and 96 pass through uninterrupted and the fibre 138 exits the central tube 11 and is spliced into a second delay line 141. The delayed signal then passes into a fibre 142 which enters a fibre sheath 15 of the cable. The fibre 142 then drives the hydrophones 1 of a fourth simple array 51d attached to the cable. The fibres 95 and 96 continue in the central tube 11 of the cable.

Next, after the fourth simple array 51d, the cable enters a fifth junction box 143 where fibres 95 and 96 exit the central tube 11 and are spliced into a third 50:50 coupler 144. In the coupler, the signals passing along fibre 95 are split into two equal channels, the first of which enters a fibre 145 which passes into a fibre sheath of the cable and proceeds to drive a fifth simple array 51e. The second channel enters a fibre 146 which is passed into the central tube 11 of the cable.

Following the fifth simple array 51e, the cable enters a sixth junction box 147. At this junction box, the fibre 146 exits the central tube and passes through a third delay line 149. The delayed signal then passes into a fibre 150 which is fed into a fibre sheath 15 of the cable to drive a sixth simple array 51f. Following the sixth junction box there are no fibres housed in the central tube 11 of the cable.

Thus there has now been described a system whereby the pairs of upstream and downstream fibres output from each of first and second nodes 59 and 61 are arranged such that each pair of fibres drives a pair of eight element simple arrays with the result that, in the present embodiment, each node drives a total of six eight element simple arrays giving a total of 96 individual hydrophone sensors in the array system.

Figure 11A:
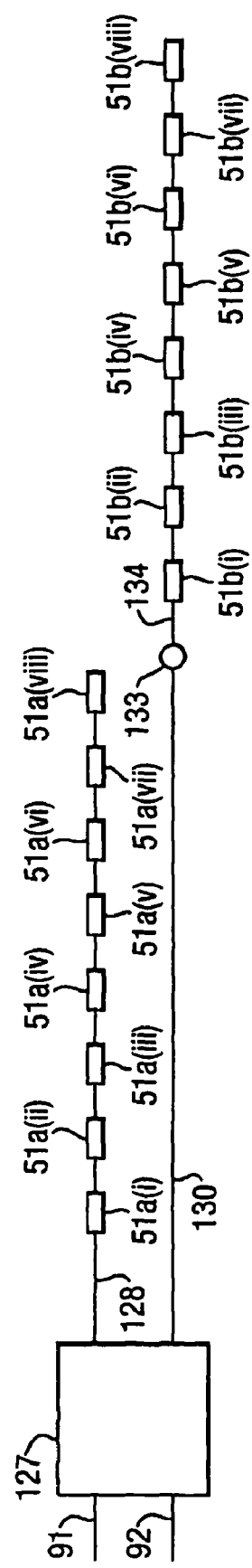
FIG. 11a shows in greater detail the arrangement of hydrophones in simple arrays of FIG. 10.
Figure 11B:
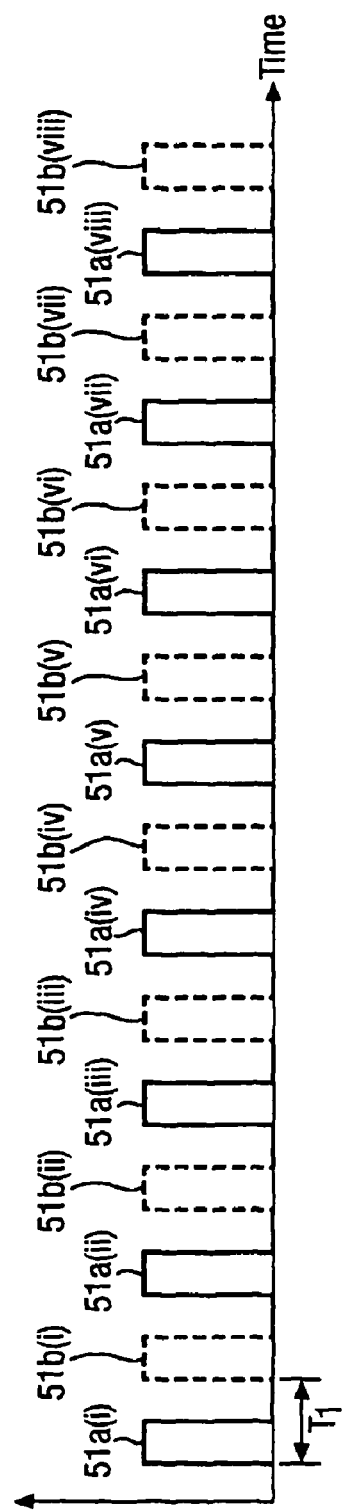

With reference to FIGS. 11a and 11b, there will now be described the signal pulse nesting arrangement made possible by the use of the delay lines 133, 141 and 149 introduced above with reference to FIG. 10.

Shown in FIG. 11a is a first simple array of hydrophones 51a(i) to 51a(viii) corresponding to the hydrophones of the simple array 51a shown in FIG. 10. Also shown is a second simple array of hydrophones 51b(i) to 51b(viii) corresponding to the hydrophones of the second simple array 51b shown in FIG. 10. As can be clearly seen in FIG. 11a, the hydrophones of the second simple array 51b are connected to the 50:50 coupler 127 following the delay line 133. The delay line 133, as described above, causes the reflected pulses from the second simple array 51b to be moved in time such that so-called "nesting" of the reflected pulses from the second simple array 51b relative to the reflected pulses from the first simple array 51a takes place.

This nesting or interleaving of the reflected pulses is shown in FIG. 11b. The length of the delay line 133 controls the time by which the outgoing and reflected pulses travelling to and from the second simple array 51b are delayed relative to the equivalent pulses travelling to and from the first simple array 51a. The time delay $T_1$ shown in FIG. 11b corresponds to twice the time delay caused by the delay line 133. Thus the reflected pulses returning from the hydrophones of the array, although corresponding to identically timed outgoing pulses (split in two by the 50:50 coupler 127) are time multiplexed for the return to the control and processing unit 57.

Although the arrangement of FIGS. 11a and 11b has been described with particular reference to the first and second simple arrays 51a and 51b shown in FIG. 10, it will be appreciated that the same applies to the third and fourth simple arrays 51c and 51d with corresponding delay line 141 and to fifth and sixth simple arrays 51e and 51f with corresponding delay line 149.

With reference to FIG. 12, there will now be described a junction box of a type suitable for use in the arrangement described above with reference to FIG. 10.

As shown in FIG. 12, attached to the cable 3 is a junction box 125 (which may suitably be used as any or all of junction boxes 125, 131, 135, 139, 143 and 147 of FIG. 10). At each end of the junction box 125, the sheath 21 of the cable 3 is removed and any fibre sheaths 15 not housing an optical fibre 17 are terminated. The strength member 11, wires 13 and fibre sheaths 15 housing an optical fibre 17 are passed through an end member 153. The strength member 11 and wires 13 are attached to the end member 153 by means of an adhesive and terminated. Fibre sheaths 15 housing an optical fibre pass through appropriately sized bores through the end member 153 and are terminated thereafter. The end members 153 are securely attached to a strong tubular body member 154. Thus any longitudinal forces in the cable 3 are transferred from the strength member 11 to the strong body member 154 via the end members 153 such that the structural integrity of the cable based array is not compromised.

The junction box 125 needs to be waterproofly sealed against ingress of water which, as noted above can be damaging to optical fibres, particularly when saline. This is achieved by firstly fitting a first sealing member 155 around each end of the junction box 125, the first sealing member 155 covering the join between the cable 3 and the end member 153 and the join between the end member 153 and the body member 154. The first sealing member 155 and the body member 154 are waterproofly sealed together by a sealing ring 156 fitted between the first sealing member 155 and the body member 154. To waterproofly seal the first sealing member 155 to the cable 3, a second sealing member 157 is fitted at each end of the junction box 125. The second sealing member 157 is waterproofly sealed to the cable 3 by an adhesive and waterproofly seals to the first sealing member 155 using a saw-tooth grip 158 similar to that described above with reference to FIG. 5.

The junction box 125 therefore has within it a central cavity 160 having at either end protruding from the end members 153 those optical fibres 17 which had been housed within the strength member 11 and within fibre sheaths 15. The fibres 17 from each end of the junction box 125, i.e. those from the two sections of cable joined at the junction box, may be connected to each other and additional components as required within the central cavity 160. For example, the central cavity may contain a number of splices joining together different sections of optical fibre and one or more couplers and/or delay lines. In order to improve protection of the fibres and components housed within the cavity 160, the cavity 160 may be filled with a shock absorbing gel surrounding the fibres and components therein.

Thus there has now been described an arrangement whereby a cable having a tubular central strength member may have that strength member broken at a junction box to extract and insert optical fibres to that member without the fibres carried within the cable bearing the longitudinal stresses within the cable.

Modifications

Although the present invention has been described with particular reference to the appended Figures in terms of the above embodiments, it will be abundantly clear that many modifications and alterations may be made to the above described embodiments without departing from the scope of the appended claims. Examples of some modifications which may be made follow hereafter although this list is not exhaustive and should not be interpreted as limiting.

Although it has been described with particular reference to FIGS. 1 and 2 that the cable is based on a steel strength member, it will be appreciated that other materials may be used for this purpose, for example Hydrel, Kevlar, etc.

Although it has been described above with reference to FIGS. 1 and 2 that the cable has a polyurethane outer sheath, it will be appreciated that other flexible waterproof materials such as rubber or other plastics materials could be used instead.

Although it has been described above with particular reference to FIG. 2 that the fibre sheaths are made from PTFE, it will be appreciated that an alternative material such as steel or another plastics material could be used.

Although it has been described above with particular reference to FIG. 2 that a plurality of fibre sheaths are present in the cable, it will be apparent that there only need be as many fibre sheaths as there are fibres to be carried in the outer part of the cable and that spare fibre sheaths may be replaced with filler rods, made from, for example, a plastics material such as nylon.

Although it has been described above with particular reference to FIG. 3 that the coil consists of approximately 100 m of optical fibre, this is not limiting and the length of fibre in the coil may be adjusted according to the physical and sensing properties desired for the coil.

Although it has been described above with particular reference to FIGS. 3 to 5 that the coupler is attached to the strength member within the hydrophone, this is not the only possible arrangement and the coupler could be attached to the inside surface of the mandrel.

Although it as been described above with particular reference to FIGS. 3 to 5 that the air-backing for the coil is made available by having a coil support cover a recess in the mandrel to form an air gap, it will be appreciated that other methods of providing an air-backing to the coil are possible, for example a foam coil support could be used such that the coil support provides the additional function of directly providing the air-backing.

Whereas it has been described above with reference to FIG. 3 to 5 that the mirrored end fibre exiting the coupler should be directed into a spare fibre channel of the cable, it will be appreciated that this is not necessary for the operation of the invention and that the mirrored end may be left coiled up within the cavity inside the mandrel of the hydrophone.

Although it has been described above with particular reference to FIG. 5 that the cavity inside the mandrel of the hydrophone should be filled with a shock-absorbing gel, it will be appreciated that the cavity could be left without any form of damping or could be filled with an alternative shock-absorbing material such as a foam.

Although it has been described above with particular reference to FIGS. 3 to 5 above that the hydrophone assembly should be waterproofly sealed to the exterior of the cable, this is not necessary in all cases as, for example, the entire cable with the hydrophone attached may be located within a further waterproof layer prior to use. Alternatively, if the hydrophone is not to be used underwater, there may be no requirement for waterproofing at all.

Although it has been described above with reference to FIGS. 6 to 10 that individual hydrophones are connected together in simple arrays of eight sensors, this is not limiting and the number of hydrophones connected into a single array is limited only be the number of individual hydrophone elements that a control system is capable of uniquely addressing. Of course if it is not necessary that each hydrophone is individually addressed, then the maximum number could rise still further.

Although it has been described above with particular reference to FIGS. 7 to 10 above that a single control unit controls a total of 96 hydrophones in twelve simple arrays of eight hydrophones split between two demultiplexing/remultiplexing nodes, this is not limiting and a control unit may control a complex array of any number of individual hydrophones split into simple arrays of any desired size and split by any number of nodes, subject only to a requirement of being able to uniquely address each hydrophone. Of course if it is not necessary that each hydrophone is individually addressed, then the maximum number could rise still further.

The invention claimed is:

1. An optical sensor assembly comprising to a cable having a strength member running through the cable and an optical fibre conduit located radially outwards therefrom,:
   an optical sensor coil provided about a hollow support member having an interior bore through which the strength member passes; and
   a coupler having a first terminal for connection to a fibre of the cable, a second terminal for connection to an input to the sensor coil and a third terminal for connection to an optical fibre having a reflective end;
   wherein the coupler is adapted to be attached at a position within the interior bore of the support member when the assembly is located at a desired position along the cable.

2. An optical sensor assembly according to claim 1, wherein the coupler is adapted to be attached to the strength member of the cable at the position within the interior bore of the support member when the assembly is located at a desired position along the cable.

3. An optical sensor assembly according to claim 1, wherein the interior bore of the support member is filled with a shock-absorbing material.

4. An optical sensor assembly according to claim 1, wherein the optical fibre having the reflective end is adapted to be inserted into a spare optical fibre conduit of the cable.

5. An optical sensor assembly according to claim 1, wherein the sensor assembly is arranged to be waterproofly sealed to the cable following assembly about the cable.

6. An optical sensor assembly according to claim 5, waterproofly sealed using a waterproof casing comprising a central member for covering the sensor coil and a pair of end members for providing a seal between the central member and the cable, and wherein the central member is joined to each end member by means of a saw-tooth fitting.

7. An optical sensor assembly according to claim 1, wherein an output of the coil is arranged to be connected to a fibre of the cable.

8. An optical sensor assembly according to claim 1, further comprising a retaining member for retaining the support member in place about the cable.

9. An optical sensor assembly according to claim 1, wherein the support member provides an air-backing to the coil.

10. An optical sensor assembly according to claim 9, wherein the support member comprises a tubular mandrel, and a coil support member located radically outwardly therefrom and upon which the coil is wound, wherein the air-backing is co-operatively provided by the tubular mandrel and the coil support member.

11. An optical sensor assembly as claimed in claim 1, wherein the sensor assembly is a hydrophone assembly and the optical sensor coil is an optical hydrophone coil.

12. A method for attaching an optical sensor assembly according to claim 1, the method comprising:
   at a desired position for the optical sensor assembly along the cable, revealing the strength member and releasing an optical fibre from the conduit;
   breaking the released fibre to create first and second ends;
   splicing the first end of the broken fibre to a first terminal of the coupler;
   splicing a second terminal of the coupler to a first end of the sensor coil;
   splicing a third terminal of the coupler to an optical fibre having a reflective end;
   splicing a second end of the sensor coil to the second end of the broken fibre; and
   locating the sensor coil supported on a hollow support member at the desired position over the cable, such that the coupler is also covered by the support member.

13. A method according to claim 12, further comprising a step of attaching the coupler to the revealed strength member of the cable before the step of locating the sensor coil at the desired position over the cable.

14. A method according to claim 12, further comprising a step of filling the internal bore of the support member with a shock-absorbing material during fitting of the support member over the coupler.

15. A method according to claim 12, further comprising a step of inserting the fibre having a reflective end into a spare optical fibre conduit of the cable before fitting of the support member over the coupler.

16. A method according to claim 12, further comprising a step of applying a waterproof coating to the sensor assembly following fitting of the support member over the coupler to seal the sensor assembly to the cable.

17. A method according to claim 16, wherein the step of applying a waterproof coating to the sensor assembly comprises applying a central member for covering the sensor coil and a pair of end members for providing a seal between the central member and the cable, and joining the central member to each end member by means of a saw-tooth fitting.

18. A method according to claim 12, wherein the support member provides an air-backing to the coil.

19. A method according to claim 12, wherein the strength member is located centrally within the cable.

20. A method according to claim 12, wherein the sensor assembly is a hydrophone assembly, and the optical sensor coil is an optical hydrophone coil.

21. An optical sensor array comprising:
   a plurality of optical sensor assemblies as claimed claim 1;
   the cable passing through the hollow support members of the sensor assemblies and carrying one or more optical fibres to which the sensor assemblies are attached; and
   the one or more optical fibres being connectable to a control unit for generating and receiving optical signals to be transmitted through optical fibre sensor coils of the sensor assemblies.

22. An optical sensor array according to claim 21, wherein a first plurality of sensor assemblies are connected in series along a single optical fibre.

23. An optical sensor array according to claim 22, wherein a second plurality of sensor assemblies are connected in series along a second optical fibre.

24. An optical sensor array according to claim 23, further comprising a node connectable between the control unit and the sensor assemblies to provide multiplexing and demultiplexing of signals travelling to and from the control unit.

25. An optical sensor array according to claim 24, wherein the first and second optical fibres are connected to the node which node demultiplexes signals received from the control unit and sends each demultiplexed signal along one of the first and second fibres.

26. An optical sensor array according to claim 25, wherein a plurality of first and second sets of sensor assemblies connected in series are attached to a single cable leaving the node with the second set of sensor assemblies being located at a position on the cable more remote the node than the first set, the strength member being hollow and all optical fibres within the cable for connection to the second set of hydrophones are housed within the hollow strength member of the cable until a position along the cable between the first and second sets of sensor assemblies, and at that position are removed from the hollow strength member for housing in a fibre conduit located radially outward from the hollow strength member within the cable at a junction box.

27. An optical hydrophone array according to claim 24, wherein a plurality of nodes are provided, each node multiplexing and demultiplexing different signals travelling to or from the control unit for sending to different sets of sensor assemblies.

28. An optical sensor array as claimed in claim 21, wherein the sensor assemblies are hydrophone assemblies.

29. An optical sensor assembly wherein the strength member is hollow, and wherein the cable includes an optic fibre within the hollow strength member.

30. An optical sensor array comprising:
 a cable having a hollow strength member running through the cable, and having at least one optic fibre located within the strength member and at least one optic fibre located radially outward of said strength member;
 a plurality of optical sensor assemblies located on said cable, said sensor assemblies including an optic sensor coil and a coupler for connecting said coil to an optic fibre of the cable located radially outward of said strength member; and
 at least one junction located on said cable at which an optic fibre located within the strength member is coupled to an optic fibre located radially outward of said strength member.

31. An optical sensor array according to claim 30, including at least first and second arrays of sensor assemblies, said second array arranged downstream of said first array, wherein, signals to said second array of assemblies are passed down a fibre located within the strength member upstream of a point along the cable between the first and second arrays, and passed down a fibre located radially outward of the strength member downstream of said point.

32. An array according to claim 30, wherein said junction comprises a body member each end of which is attached to the strength member of the cable, and wherein the body defines a central cavity into which enter optic fibres both from within the strength member and from radially outwards of it.

* * * * *